UNITED STATES PATENT OFFICE.

RUDOLF CASPARI, OF UERDINGEN, GERMANY, ASSIGNOR TO R. WEDEKIND & CO., M. B. H., OF UERDINGEN, GERMANY.

PROCESS OF MAKING GRANULAR SODIUM BICHROMATE.

1,003,875.      Specification of Letters Patent.    Patented Sept. 19, 1911.

No Drawing.     Application filed September 7, 1910. Serial No. 580,914.

*To all whom it may concern:*

Be it known that I, RUDOLF CASPARI, a resident of 4 Hohenzollernstrasse, Uerdingen-on-the-Rhine, Germany, and a subject of the German Emperor, have invented Improvements in Processes of Making Granular Sodium Bichromate, of which the following is a specification.

Bichromate of sodium is at present sold in the form of: 1st, large crystals, 2nd, small crystals, crystallized in motion, 3rd, fused lumps, 4th, powder, made from the fused lumps by grinding and screening. In either form it analyzes about 67 to 68% of chromic acid ($CrO_3$), while $Na_2Cr_2O_7$ theoretically contains 76.3% $CrO_3$, so that in shipping the commercial products freight has to be paid on the water present therein. Besides, the crystals ($Na_2Cr_2O_7$,2aq. with 67.1% $CrO_3$) are very hygroscopic, the fused lumps are unhandy on account of their size, and if broken up or ground to a powder, very annoying and harmful dust is formed, not only during the process of grinding and screening, but also while the product is handled later on. I have discovered that none of these difficulties and annoyances is connected with the use of a granular and consequently handy, non-dusting and highly concentrated bichromate of sodium, which is made in the following manner, by starting from crystallized bichromate of sodium obtained as small crystals by crystallization in motion, or from some similar form of the water containing salt granulated e. g. by grinding and screening. The salt freed from its mother-lye by suction filters or centrifugals is gradually heated in a revolving steam-jacketed cylinder or in a vessel with a stirrer placed over a stove, until it reaches the melting point of crystallized bichromate of sodium, or to about 110° C., while a sufficient quantity of air is passed over the material to solidify the softening crystals or granulated particles before they cake, and in order to immediately take away the steam generated. The partly dried material soon commences to roll, as the small crystals or granulated particles readily give off the adhering moisture as well as the water of crystallization. The dehydration proceeds without any material change of the form of the crystals or of the granules and without any formation of dust. According to the percentage of chromic acid desired in the product, the dehydration is either completed or interrupted after it has proceeded to the desired point. In the first case a gradual rise of the temperature to about 130° C. accelerates the process.

The product represents a non-dusting, vividly red, granular and therefore handy bichromate of sodium, containing up to 75% chromic acid ($Na_2Cr_2O_7$ contains 76.3% $CrO_3$ theoretically) according to the degree of dehydration and the percentage of impurities in the starting material. It is less hygroscopic than the large crystals or the lumps of the trade.

The process can be modified in the manner that a solution of bichromate of sodium is added to the material while being dried, gradually and in such quantities as will continuously dry on the surface of the crystals or of the granules, until these have reached the desired size or as long as no dust is formed by the friction of too large particles. The product consists of spherical granules, free from dust, of a vividly red color, a handy form and with a high percentage of chromic acid.

It was not to be foreseen that a moist mass of small crystals or granulated particles would yield a product with so desirable properties. It was on the contrary to be expected, that the mass would behave similarly as it does, if being dried without motion, viz., cake or fuse, and develop dust during the final stage of the drying as well as while being ground.

I claim:

1. The process of making granular sodium bichromate which consists in heating a mass of crystallized salt gradually to near its melting point during agitation and removing the steam as it generates during said heating step.

2. The process of making granular sodium bichromate which consists in heating a mass of crystallized salt gradually to near its melting point during agitation and bringing a current of air into contact with said mass to remove the steam as it generates during said heating step.

3. The process of making granular sodium bichromate which consists in heating a mass of crystallized salt gradually to near its melting point during agitation, adding such proportion of a solution of sodium bichromate as will dry on the surface of the granules formed, and removing the steam as it generates during said heating step.

In testimony whereof I have signed my name to this specification, in the presence of two subscribing witnesses.

RUDOLF CASPARI.

Witnesses:
HENRY QUADFLIEG,
WILLIAM J. REUTERS.